US006278754B1

(12) United States Patent
Thomas et al.

(10) Patent No.: US 6,278,754 B1
(45) Date of Patent: Aug. 21, 2001

(54) DEMODULATION OF ASYNCHRONOUSLY SAMPLED DATA BY MEANS OF DETECTION-TRANSITION SAMPLE ESTIMATION IN A SHARED MULTI-CARRIER ENVIRONMENT

(75) Inventors: James R. Thomas, Sandy Spring; Soheil I. Sayegh, Gaithersburg, both of MD (US)

(73) Assignee: Comsat Corporation, Bethesda, MD (US)

( * ) Notice: Subject to any disclaimer, the term of this patent is extended or adjusted under 35 U.S.C. 154(b) by 0 days.

(21) Appl. No.: 09/269,241

(22) PCT Filed: Sep. 19, 1997

(86) PCT No.: PCT/US97/16349

§ 371 Date: Mar. 19, 1999

§ 102(e) Date: Mar. 19, 1999

(87) PCT Pub. No.: WO98/12849

PCT Pub. Date: Mar. 26, 1998

Related U.S. Application Data

(60) Provisional application No. 60/026,431, filed on Sep. 20, 1996.

(51) Int. Cl.[7] .................................................. H04L 7/02
(52) U.S. Cl. ........................................ 375/360; 375/348
(58) Field of Search ..................................... 375/348, 360

(56) References Cited

U.S. PATENT DOCUMENTS

| | | | |
|---|---|---|---|
| 5,228,062 | * 7/1993 | Bingham | 375/97 |
| 5,313,496 | * 5/1994 | de Goede | 375/95 |
| 5,317,734 | * 5/1994 | Gupta | 395/650 |
| 5,459,473 | * 10/1995 | Dempster et al. | 342/357 |
| 5,537,435 | 7/1996 | Carney et al. | 375/219 |
| 5,812,334 | * 9/1998 | Behrens et al. | 360/40 |

* cited by examiner

Primary Examiner—Stephen Chin
Assistant Examiner—Tony Al-Beshrawi
(74) Attorney, Agent, or Firm—Sughrue, Mion, Zinn, Macpeak & Seas, PLLC

(57) ABSTRACT

In a multi-channel demodulator, a detection-transition sample estimation scheme classified samples as left (L) or right (R) of a reference position within a symbol interval (110), or before (B) or after (A) a transition between symbols (120). When a sample is classified as L or B, the classification of the next sample is forced to R or A, respectively. A memory is provided for storing the contents of various registers when switching to processing of a different channel, and for retrieving from the memory stored data corresponding to previous processing of the different channel. Data read from the memory is written to a register downstream of the register from which it was taken when written to the memory. The read cycle of the memory is extended to ensure that a clock is available to load the data from memory into the downstream register after switching to the new channel.

48 Claims, 12 Drawing Sheets

DTSE TIMING DIAGRAM

INITIAL DETECTION SAMPLE ESTIMATION CIRCUIT

DETECTION SAMPLE ISI REMOVAL CIRCUIT

TRANSITION SAMPLE ESTIMATION CIRCUIT

CLOCK LOOP ERROR DETECTION AND LOOP FILTER

P VALUE AND GATE GENERATOR

CLOCK GATE STATE MACHINE
FOR 2-3 SAMPLES / SYMBOL

CLOCK GATE STATE MACHINE
FOR 2-4 SAMPLES/SYMBOL

READ GATE STATE MACHINE

READ GATE TIMING DIAGRAM

SHARED REGISTER BLOCK DIAGRAM

DEMODULATION OF ASYNCHRONOUSLY SAMPLED DATA BY MEANS OF DETECTION-TRANSITION SAMPLE ESTIMATION IN A SHARED MULTI-CARRIER ENVIRONMENT

Benefit is claimed under 35 U.S.C. §119 of Provisional Application No. 60/026,431, filed on Sep. 20, 1996, which is incorporated herein by reference.

FIELD OF THE INVENTION

The present invention relates to a demodulator for use in an asynchronous satellite communications system. More specifically, the present invention relates to a demodulator circuit and method for detection and transition sample estimation in a shared multi-carrier environment.

DESCRIPTION OF RELATED ART

Traditionally, satellites have performed the function of a simple repeater in the sky. More is recently, new satellite architectures have been proposed that require on-board demultiplexing and demodulation of frequency-division multiple access (FDMA) up-link carriers, baseband processing, routing, remultiplexing, and remodulation for down-link transmissions. This on-board baseband signal regeneration provides significant connectivity and link advantages.

For asynchronous networks, the various carrier up-link transmissions are not clock-synchronous. When using a block demultiplexer architecture, the samples at the demultiplexer output are timed relative to the clock that controls the demultiplexer. Therefore, it is not possible to synchronize the demultiplexer output samples with the symbols of the various carriers. On the other hand, the number of samples used in the demodulator is ordinarily established by the need to sample the carrier signal appearing at the demodulator input at a rate that is a precise integer multiple of (e.g. usually twice) the symbol rate. Furthermore, the time phase of these samples must be adjusted to align the samples at the proper positions in each symbol. To bridge this gap between the demultiplexer output and the demodulator input, a sample interpolator has been typically used. However, the conventional interpolator function is computationally intensive, thus requiring a substantial amount of power.

An improvement was described in a paper published in 1990 by Soheil Sayegh entitled "DSM MCD for FUTURE IBS/IDR Services", Second International Workshop on Digital Signal Processing Techniques Applied to Space Communications. This paper, incorporated herein by reference, describes the concept of a multi-carrier demodulator (MCD) capable of handling asynchronous input samples and not requiring a synchronous network. At the same time, the MCD is reprogrammable from the ground to handle different frequency plans and carrier data rates. To accomplish the handling of asynchronous input samples, the MCD incorporates a digital signal processing scheme called Detection/Transition Sample Estimation (DTSE) for demodulating asynchronous samples in a multi-rate environment.

DTSE utilizes the value and position of the two samples that bound the mid-symbol point to estimate the value of the detection sample, while the transition (end-of-symbol) sample is estimated in a similar manner. In the data detection path, an additional stage of inter-symbol interference removal processing can be added to improve the value of the detection sample before symbol resolution.

The above-cited paper contemplates the use of a high precision counter to keep track of relative sample position within a symbol, and then simply classifying each sample as L (left), R (right) or $\zeta$ (unused) depending on the position within a symbol. It is a requirement for proper operation of a DTSE system that the first used sample be a left (L) sample and that the sample immediately following be a right (R) sample. However, due to timing corrections which may be made between samples, it is possible for the samples to be classified such that this requirement is not satisfied, e.g., with two successive samples being classified as L or R, an L sample followed by an unused sample, etc., resulting in faulty operation.

A further problem with prior art in digital processing in general is that, in operation with multiple channels, there may be a significant time penalty in storing the register contents for one channel and retrieving from memory the information to be loaded into registers for continued processing of the next channel.

SUMMARY OF THE INVENTION

In view of the foregoing, it is an object of the present invention to provide a demodulator circuit which operates with low power dissipation, and which is not subject to the sample position ambiguity of the prior art.

It is a further object of the present invention to provide a demodulator circuit which can more efficiently operate with multiple channels.

The demodulator circuit according to the present invention includes an initial detection sample estimation circuit which receives the input data signal, takes a plurality of samples for each symbol of the input data signal and produces an estimated detection sample of the input data signal based on the plurality of samples, which may optionally be delivered to an inter-symbol interference (ISI) removal circuit. Also included in the demodulator circuit is a transition sample estimation circuit which receives the input data signal, takes a plurality of samples for each symbol of the input data signal and produces an estimated transition sample based on the plurality of samples.

The demodulator circuit also includes a clock loop error detection and loop filter circuit which receives the estimated transition sample and produces an estimated symbol timing correction value. The demodulator circuit further includes a relative position value generator circuit which produces a plurality of position values representing the position of each detection and transition sample in a symbol of the input data, the position values being determined in accordance with both the estimated symbol timing correction value produced by the clock loop error detection and loop filter circuit and in accordance with a known distance between successive samples.

The demodulator circuit also includes a gate generator circuit which receives the plurality of position values and produces timing gate signals in accordance with a classification scheme. According to the present invention, when a sample is classified as being left of the mid-point, the next sample is forced to be classified as right of the mid-point, regardless of the position count. Similarly, after a sample that is classified as being before the transition point, the next sample will always be classified as after the transition point, regardless of the position count.

The position values, together with the timing gate signals, are then used by various circuits of the demodulator circuit in order to control the selection of samples.

According to another aspect of the invention, the demodulator circuit may also be provided with a switching controller circuit which controls the demodulator circuit so that a plurality of channels may be processed by the demodulator circuit. According to one aspect of the invention, each of the just-mentioned circuits in the demodulator circuit may be constituted by a plurality of shared register circuits which each include a register, an output device and a random access memory which stores data input from the register during a write cycle of the random access memory and outputs data to the output device for processing and storage in a subsequent register during a read cycle of the random access memory.

The invention is also directed to a method of implementing and operating the demodulator described above.

BRIEF DESCRIPTION OF THE DRAWINGS

These and other features, aspects and advantages of the present invention will become better understood with reference to the following description, appended claims, and accompanying drawings, in which:

DETAILED DESCRIPTION OF THE INVENTION

The demodulator according to the present invention may be implemented as or included within an application specific integrated circuit (ASIC) for use as a multi-carrier demodulator (MCD) on-board a satellite. However, alternative implementations of the MCD are possible, e.g., as a field programmable gate array (FPGA) or with discrete hardware, and the device may be employed in terrestrial applications as well. The demodulator can demodulate asynchronous samples in a multi-rate environment without the use of interpolating filters.

The processing scheme can be used with asynchronous samples in the range of less than 2 to greater than 4 complex samples/symbol in a multi-rate environment of less than 64 kbits/s to greater than 25 Mbits/s. The inventive MCD may be made to operate in continuous or burst mode quadriphase-shift keying (QPSK), binary phase-shift keying (BPSK) or other modulation techniques. The inventive MCD also implements an all digital realization of carrier and clock synchronization.

The present invention, which incorporates aspects of the preliminary version of DTSE discussed in the above-mentioned paper, utilizes the value and position of the two samples that bound the mid-symbol point to estimate the value of the detection sample, while the transition (end-of-symbol) sample is estimated in a similar manner. In the data detection path, an additional stage of inter-symbol interference removal processing is added to improve the value of the detection sample before symbol resolution.

The DTSE Scheme and Its Implementation

Figure 1:
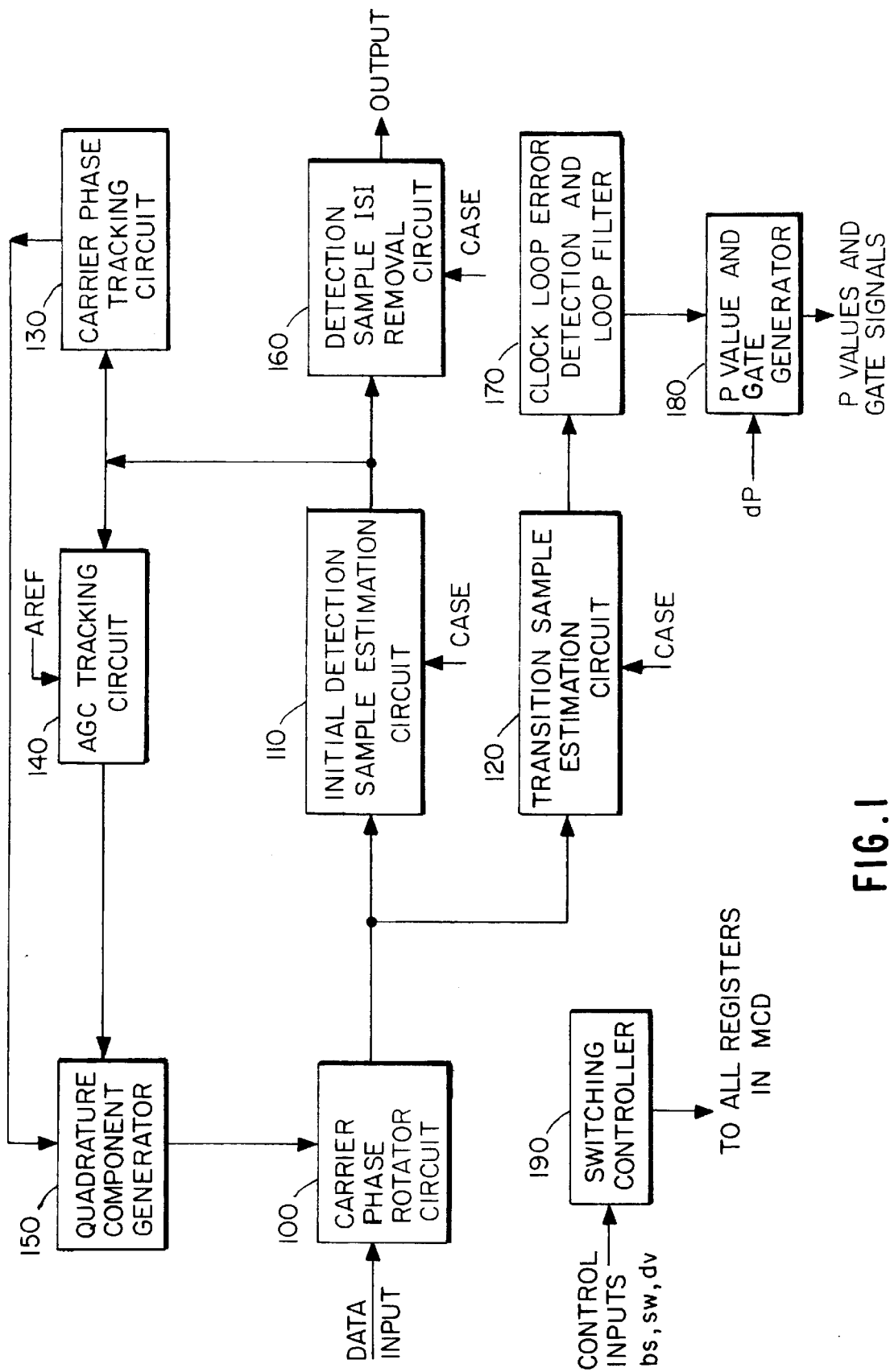
FIG. 1 is a block diagram of a multi-carrier demodulator (MCD) according to the present invention.

In FIG. 1, which shows a block diagram of the MCD of the present invention, a demultiplexed carrier signal associated with a specific channel, together with carrier signals for other channels, is input to a digital carrier phase rotator circuit 100 in a time domain multiplexed fashion. The output of the carrier phase rotator circuit 100, which represents the phase and level corrected in-phase (I) and quadrature (Q) components of the input data signal, is passed to the initial detection sample estimation circuit 110 and the transition sample estimation circuit 120, which are both part of the above-mentioned DTSE scheme.

Estimated in-phase and quadrature components associated with detection samples of the data input are output by the initial detection sample estimation circuit 110 to a carrier phase tracking circuit 130. The carrier phase tracking circuit 130 outputs a phase error signal in order to correct the phase of the in-phase and quadrature components of the data input.

Internally, the carrier phase rotator circuit 100 removes the carrier phase and frequency offsets under the control of the carrier recovery loop included in the carrier phase tracking circuit 130, as follows. After the input samples are re-clocked, the carrier phase rotator circuit 100 performs the following well-known operations in order to facilitate the correction of the phase of the in-phase and quadrature components of the data input:

$$I_k = I'_k{}^* \cos\theta - Q'_k{}^* \sin\theta, \text{ and}$$

$$Q_k = I'_k{}^* \sin\theta + Q'_k{}^* \cos\theta.$$

By way of example, the carrier phase tracking circuit 130, the AGC tracking circuit 140, and the clock loop error detection and loop filter circuit 170 may include the second order phase locked loop of the Joint Estimation and Detection (JED) demodulation scheme described in detail in U.S. Pat. No. 4,419,759, which is incorporated herein by reference.

An automatic gain control (AGC) tracking circuit 140, which also receives the output of the initial detection sample estimation circuit 110, outputs an estimated level error signal which is used to correct the level of the in-phase and quadrature components of the data input. By way of example, the AGC tracking circuit 140 can be implemented as a digital first order phase locked loop (PLL).

A quadrature component generator 150 receives the phase error and estimated level error signals output by the carrier phase tracking circuit 130 and the AGC tracking circuit 140, respectively. The quadrature component generator 150 computes scaled cosine and sine values and outputs them to the carrier phase rotator 100. The output of the carrier phase rotator 100 reflects the phase and level adjustments generated by the quadrature component generator 150.

The in-phase and quadrature components of the estimated detection samples are also output from the initial detection sample estimation circuit 110 to a detection sample inter-symbol interference (ISI) removal circuit 160, which accounts for inter-symbol interference that adversely affects the values of the estimated detection samples generated by the initial detection sample estimation circuit 110. The output of the detection sample ISI removal circuit 160 corresponds to the final output of the MCD, the output being the in-phase and quadrature components of multi-bit soft decision output data.

The transition sample estimation circuit 120 outputs estimated transition samples to a clock loop error detection and loop filter circuit 170, which, in turn, outputs an estimated symbol timing correction signal which is preferably at least 14 bits precision. The output of the clock loop error detection and loop filter circuit 170 is received by a P value and gate generator 180 which uses the estimated symbol timing correction signal to correct a free running P value. This corrected P value reflects the relative position of a sample in a symbol. The P value and gate generator 180 also receives an externally generated signal dP. The signal dP represents the expected distance between successive samples, i.e., the relative positioning of P values with respect to each other. Each P value associated with a sample will be spaced from the P value of the previous sample by an amount corresponding to the signal dP as adjusted by the timing correction signal.

An externally generated signal, CASE, provides information as to the range of samples per symbol in which the device is operating. The signal CASE is received by the initial detection sample estimation circuit 110, the detection sample ISI removal circuit 160 and the transition sample estimation circuit 120.

The output of the P value and gate generator 180 includes P values and timing gate signals which are received by both registers and look-up tables. The timing gate signals determine whether symbols will be processed or ignored by the processing elements of the MCD of the present invention. Advantageously, the present invention includes internally closed carrier and clock loops, which eliminates the need for external voltage controlled oscillators (VCOs) or numerically controlled oscillators (NCOs).

The initial detection sample estimation circuit 110, the detection sample ISI removal circuit 160, the transition sample estimation circuit 120, and the P value and gate generator 180 implement the DTSE scheme mentioned above, improved in accordance with the present invention. The DTSE scheme, which relies on the use of the demodulation techniques discussed below, is an alternative to a conventional interpolating filter, and allows the MCD to operate directly on a non-integer number of samples per symbol.

Figure 2:
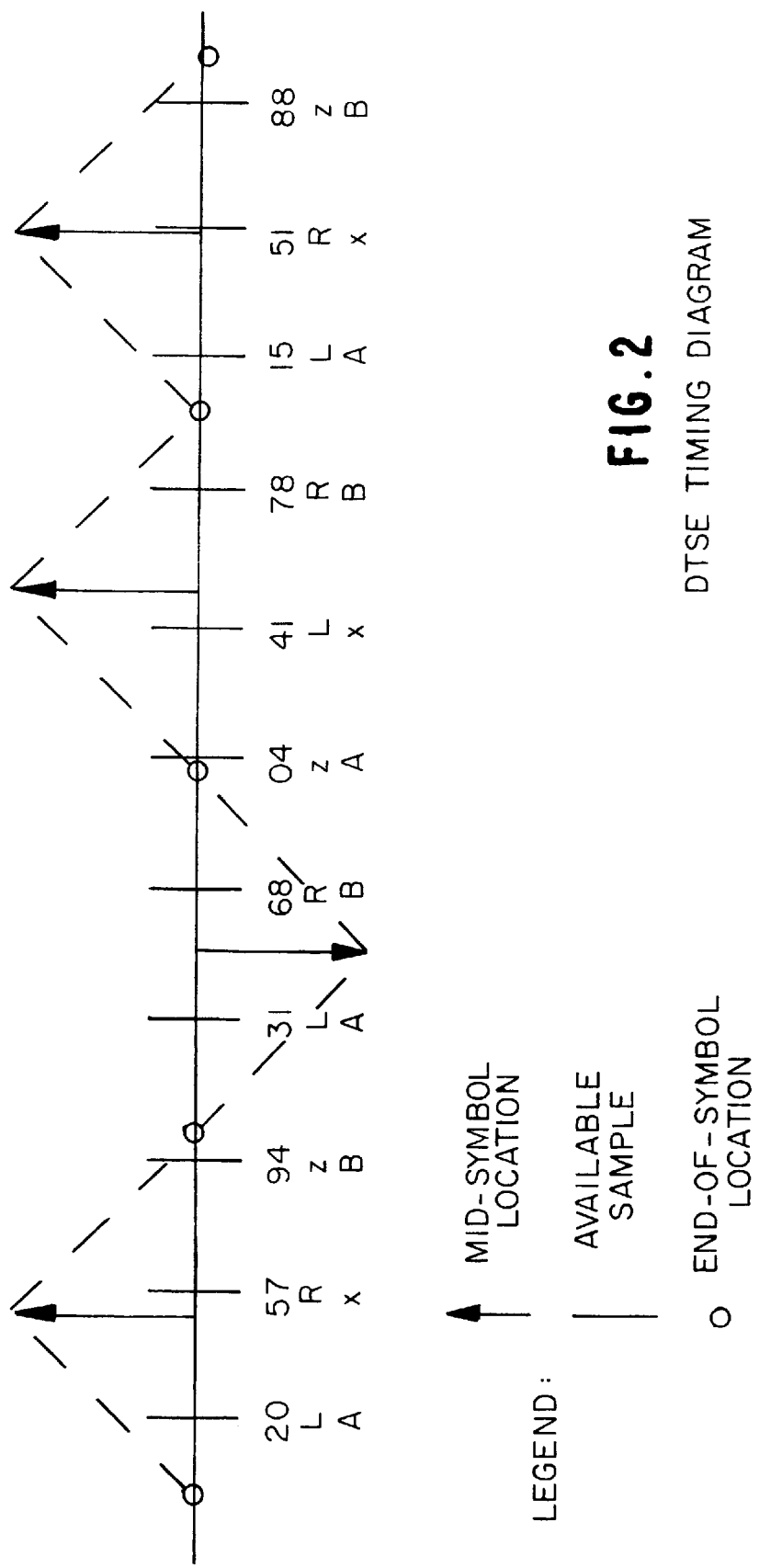
FIG. 2 is a timing diagram showing symbol locations.

FIG. 2 depicts one example of a time diagram showing the available sample locations, the mid-symbol sample location, and the symbol-edge sample locations associated with a specific symbol. The time diagram of FIG. 2 is for 2.718 samples per symbol which corresponds to about a 36.8% symbol separation between samples. An accumulator within the P value and gate generator 180 (FIG. 1) keeps track of the relative sample position P within a symbol. Corrections to the accumulator are provided at regular intervals from the clock loop error detection and loop filter circuit 170 of FIG. 1.

In the example of FIG. 2, the symbol period is taken as one unit and the sample locations within a symbol are expressed in FIG. 2 as a percentage of a symbol which corresponds to a P value. Thus, for example, the mid-symbol sample has a P value of 50. For detection purposes, the samples are classified as L (Left of center), R (Right of center) and z (not used). The samples denoted z are the ones that are far from the mid-point of a symbol. Clearly, there is little loss in performance in not including the z samples in the detection scheme because they are at the symbol edges. Once a sample position P is known, the sample can be classified as an L, R, or z, subject to the control of the Clock Gate State Machine and P Delay chain discussed below which are included in the P value and gate generator 180.

By way of example, a P value falling between 0 and 12, inclusive, may be classified as a z. A P value falling between 13 and 49, inclusive, may be classified as an L. The subsequent sample is then classified as R by the clock gate state machine.

It is important to note that a determination as to how a P value is classified is subject to the output of the above-mentioned Clock Gate State Machine and P Delay chain. If P values were assigned solely on the basis of their position within a range of values, without any further considerations, then the circuit may not operate properly. For example, the MCD would not operate properly if two adjacent samples were classified as being left of center. Other mis-classifications may also occur. The Clock Gate State Machine and P Delay chain ensures that the MCD classifies samples properly.

For clock tracking purposes, the transition samples are classified as "A" (After symbol edge), "B" (Before symbol edge) or "x" (not used). Samples which are classified as A or B are used to obtain a rough indication of zero crossings. Referring to FIG. 2, once a sample position P is known, the sample can be classified as A, B, or x, again subject to the control of the Clock Gate State Machine and P Delay chain included in the P value and gate generator 180. By way of example, a P value falling between 0 and 37 will be classified as A. A P value falling between 38 and 62, inclusive, may be classified as x, whereas a P value falling between 63 and 99, inclusive, may be classified as B. However, as noted above, if P values are classified solely based on their position within a range of values, the circuit may not operate properly. The MCD of the present invention utilizes the Clock Gate State Machine and P Delay chain to ensure the proper classification.

For the purpose of discussing the generation of detection samples, it will be assumed that proper carrier and clock synchronization tracking have been carried out. The detection scheme is a two-stage process. In the first stage, a preliminary decision is made regarding the value of the in-phase and quadrature (I and Q) components of the detection samples. This decision is rendered in the initial sample estimation circuit (element 110 of FIG. 1) and then refined in the second stage. The first stage is necessary due to the use of a non-integer number of samples per symbol. In essence, at represents a "simplified" interpolation process.

Figure 3A:
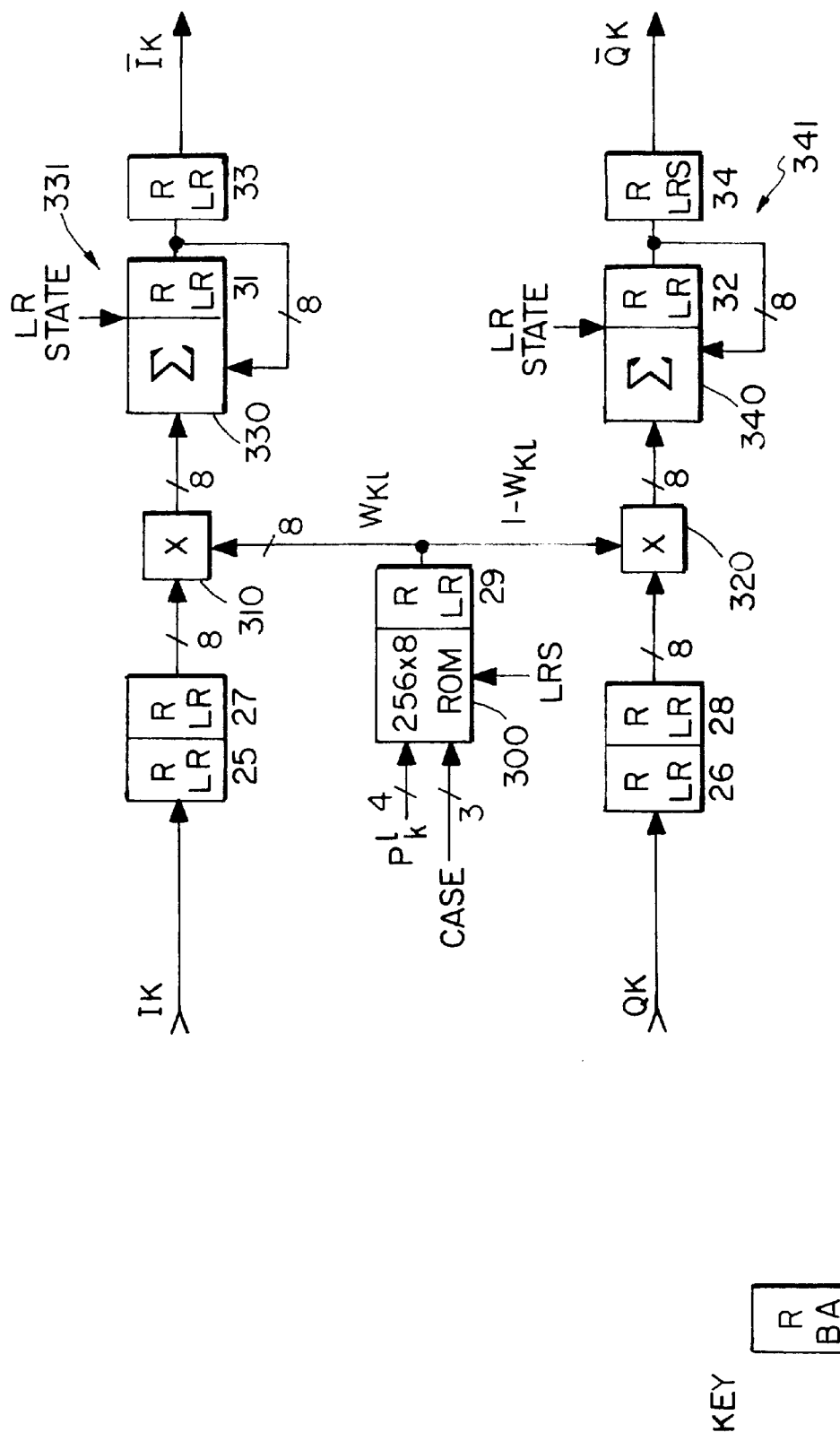
FIG. 3A is a block diagram of an initial detection sample estimation circuit according to the present invention.

The internal constitution of the initial sample estimation circuit 110 (FIG. 1) is shown in FIG. 3A. The key shown in FIG. 3A should also be used for FIGS. 3B–3E. Initially, the phase and level corrected in-phase and quadrature components of the data input from the carrier phase rotator circuit 100 (FIG. 1) are routed through registers 25–28 in order to compensate for delays in the derivation of the P values for a DSE look-up table (LUT) which is embodied in a 256×8 ROM 300. The 256×8 ROM 300 receives as input a P value, the externally generated signal CASE, and an LRS signal output by the P value and gate generator 180 (FIG. 1). The delayed in-phase and quadrature components of the data input are then applied to multipliers 310 and 320 together with detection sample estimation (DSE) coefficients output from the 256×8 ROM 300. These multipliers 310 and 320 perform the operations:

$$t1 = I_{kl} * W_{kl}, \text{ and}$$

$$t2 = I_{kr} * (1 - W_{kl})$$

where t1 and t2 are temporary results, $W_{kl}$ is a coefficient, and $I_{kl}$ and $I_{kr}$ are the left and right in-phase components of the detection path samples, respectively. The coefficient $W_{kl}$ or $(1-W_{kl})$ is selected by the LRS input to the 256×8 ROM which tells the LUT whether the L or R sample is at the multiplier input. The same operation is performed for the quadrature components of the L and R detection path sample. The coefficients $W_{kl}$ and $(1-W_{kl})$ are preferably determined in accordance with the formulae for $W_l$ and $W_r$ set forth later herein.

The intermediate results, t1 and t2, for both the in-phase and quadrature components of the detection samples are provided to adders 330 and 340. An LR state signal (received from the Clock Gate State Machine discussed below) resets the adders 330 and 340 at the beginning of each symbol as required to give the correct sum operation. The outputs of the adders 330 and 340 are received by registers 31 and 32, with the outputs of the registers 31 and 32 being fed back to the input of the adders 330 and 340 to form accumulators 331 and 341 which produce an initial detection path estimated symbol.

Registers 33 and 34 receive the outputs of the accumulators as inputs, re-clock the results at the symbol rate, and source the data pick-off for the carrier phase tracking circuit 130 (FIG. 1), the AGC tracking circuit 140 (FIG. 1) and the detection sample ISI removal circuit 160 (FIG. 1).

The second stage of the above-mentioned detection scheme addresses two sources of degradation which result when the detection samples diverge from the mid-point sample position. These sources of degradation affect the estimated values of the in-phase and quadrature components of the detection samples which are output by the initial detection sample estimation circuit 110 (FIG. 1). One source of degradation is inter-symbol interference (ISI) while the other is a loss of signal to noise ratio (SNR). The second stage of the detection process is performed by the detection sample ISI removal circuit 160.

With respect to the loss of SNR which results from the detection scheme of the present invention, consider a single pulse (no ISI) at the receiver after matched filtering. The matched filter maximizes the output SNR at the mid-symbol instant. If the mid-symbol sample value is not known and only the values and positions within the pulse of samples L and R are known, then the linear combination of L and R that maximizes the SNR in the decision is given by:

$$w_1 s(-1) + w_r s(r)$$

where $$w_1 = \frac{h(l) - h(r) h(l+r)}{[1 - h(l+r)][h(l) + h(r)]}$$

and $$w_r = 1 - w_1 = \frac{h(r) - h(l) h(l+r)}{[1 - h(l+r)][h(l) + h(r)]}$$

and where $h(\cdot)$ is the impulse response of a raised cosine filter.

The loss in SNR resulting from the use of the L and R samples instead of the mid-symbol sample is less than 0.1 dB. Therefore, the main source of degradation when using a combination of samples which are not at the detection point in the actual case of multiple pulse transmission is the ISI factor and not the loss of SNR. Accordingly, only a detection sample ISI removal circuit (element 160 of FIG. 1) is included in the MCD of the present invention, with no SNR signal loss compensation circuit. Nevertheless, if optimal performance is desired, a SNR signal loss compensation circuit could be incorporated in the MCD.

In order to improve on the preliminary decisions reached above, it is necessary to remove the effect of ISI, in particular the ISI due to the two neighboring pulses (one on each side). Since the location of the L and R samples within the adjacent pulses are known, the magnitude of ISI at the L or R sample due to any pulse can be easily computed. Once the polarity of that pulse is estimated, the value (magnitude and sign) of its ISI contribution to the L and R samples can be easily found.

By way of example, the preliminary estimate of the $n^{th}$ detection sample $\hat{S}_p(n)$ is revised, and a new estimate $\hat{S}(n)$ is computed as follows:

$$\hat{S}(n) = \hat{S}_p(n) - D_p(n-1)|ISI(n-1, p_n)| - D_p(n+1)|ISI(n+1, p_n)|$$

where $D_p(n)$ is the polarity of $\hat{S}_p(n)$, $|ISI(n-1,p_n)|$ is the magnitude of the ISI contribution to $\hat{S}_p(n)$ from the proceeding symbol, and $|ISI(n+1,p_n)|$ is the magnitude of the ISI contribution to $\hat{S}_p(n)$ from the next symbol.

The MCD of the present invention operates in an asynchronous system, in which the phase error estimate must be determined using the estimated in-phase and quadrature components of the detection samples.

Although FIG. 1 shows the output of the initial detection sample estimation circuit 110 (FIG. 1) being used to obtain a phase error estimate, the output of the detection sample ISI removal circuit 160 may be used instead. The estimated or ISI corrected in-phase and quadrature components of the detection samples both provide adequate results when estimating phase errors. The advantage in using the estimated in-phase and quadrature components of the detection sample is that the phase error estimate can be determined faster and the loops will be more stable, whereas the advantage of using the ISI corrected in-phase and quadrature components of the detection sample is that reduced noise is present in the estimated values so that the resulting phase errors are more accurate. Simulation results show that the rms jitter is almost identical in both cases.

Figure 3B:
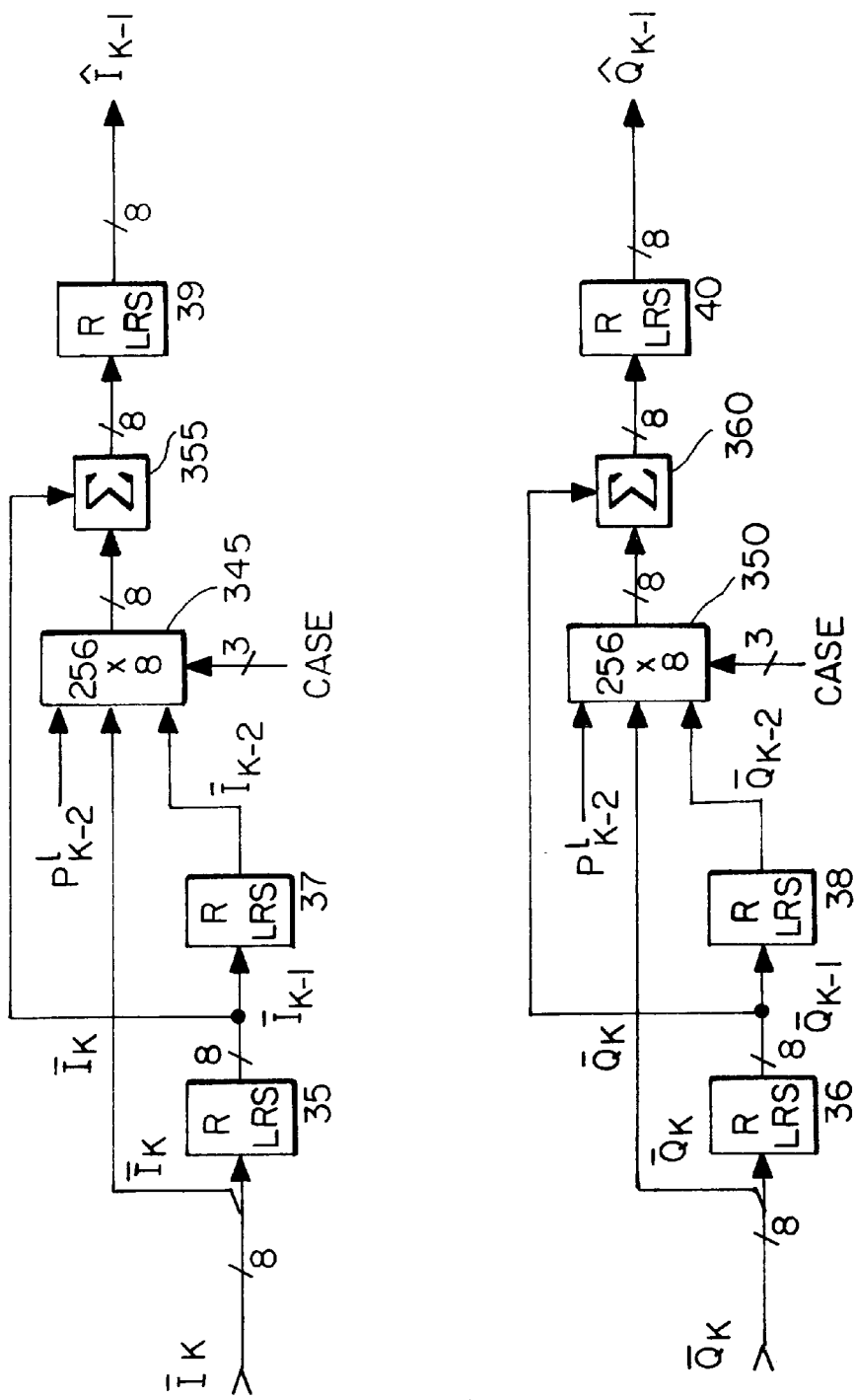
FIG. 3B is a block diagram of a detection sample ISI removal circuit according to the present invention.

FIG. 3B shows the internal constitution of the detection sample ISI removal circuit of FIG. 1 which embodies the second stage of the above-mentioned detection scheme. Registers 35 and 36 receive the estimated in-phase and quadrature components of the detection samples (i.e. the next symbols $I_k$ and $Q_k$) and output the current symbols $I_{k-1}$ and $Q_{k-1}$ to the registers 37 and 38, which, in turn, output the previous symbols $I_{k-2}$ and $Q_{k-2}$.

The outputs of the registers 37 and 38 are received by 256×8 ROMs 345 and 350, respectively. The 256×8 ROMs 345 and 350 also receive the inputs (i.e. the next symbols $I_k$ and $Q_k$) of the registers 35 and 36, respectively. Finally, P values are also input to the 256×8 ROMS 345 and 350 along with the externally generated signal CASE. The P values are generated by the P value and gate generator 180 of FIG. 1 in the manner discussed below.

The symbols $I_{k-2}$, $I_k$, $Q_{k-2}$ and $Q_k$ are used to address ISI look-up tables (LUTs) stored in the 256×8 ROMs 345 and 350. The ISI LUT has an offset compensation factor built in, to make up for the net effects of the offsets resulting from certain truncation operations and arithmetic compromises in the detection path. Those skilled in the art will appreciate that standard logic gates may also be configured by synthesis to perform the equivalent functions of the ISI look-up tables so that no ROMs are required.

The outputs of the 256×8 ROMs 345 and 350 are received by adders 355 and 360 which also receive the output of the registers 35 and 36, respectively. The outputs of the adders 355 and 360 are received by registers 39 and 40, respectively. The registers 39 and 40 merely re-clock the in-phase and quadrature components of the multi-bit soft decision output data at a predetermined symbol rate for delivery to the outside world.

The ROM 300 provides a coefficient output in accordance with the P value of the left sample and the CASE variable C. Alternatively, the address input could be four bits for a left sample P value and four bits for a right sample P value, for a total of 8 bits, and such an implementation is contemplated as an alternative within the scope of the present invention. However, as another alternative, since the position of the right sample could be determined by adding to the left sample P value the distance between successive samples, the address could instead be a concatenation of the left sample P value and the inter-sample distance dP. In the preferred embodiment, the CASE variable C is used instead of the inter-sample distance dP.

The present inventor has found that the performance of the MCD is not very sensitive to the precision of the value of the externally generated signal CASE. Thus, the signal CASE is represented in only 3 bits. The reduced number of bits allocated for the signal CASE cuts the size of the LUT in half, compared to the use of four bits which would be necessary if a separate P value where used for the right sample R.

If the MCD is processing 2 to 3 samples per symbol, then the CASE values may be selected as follows:

| sample/symbol | CASE |
| --- | --- |
| (>)2.00–2.15 | 7 |
| 2.15–2.25 | 6 |
| 2.25–2.35 | 5 |
| 2.35–2.45 | 4 |
| 2.45–2.55 | 3 |
| 2.55–2.65 | 2 |
| 2.65–2.75 | 1 |
| 2.75–(<)3.00 | 0 |

However, if the MCD is processing 2 to 4 samples per symbol, then the CASE values are selected as follows:

| sample/symbol | CASE |
| --- | --- |
| (>)2.00–2.1 | 7 |
| 2.1–2.3 | 6 |
| 2.3–2.5 | 5 |
| 2.5–2.8 | 4 |
| 2.8–3.1 | 3 |
| 3.1–3.4 | 2 |
| 3.4–3.8 | 1 |
| 3.8–(<)4.0 | 0 |

Other ranges, including numbers of samples per symbol less than 2, are possible with minor modifications to the CASE tables and state machine.

Data precision is held to 8 bits throughout the detection path while the gain is held to one as well. This is necessary to maintain maximum precision throughout and to avoid saturation during AGC transients. Eight bit precision was selected on the basis of early simulations as adjusted by considerations regarding AGC and dynamic range.

Figure 3C:
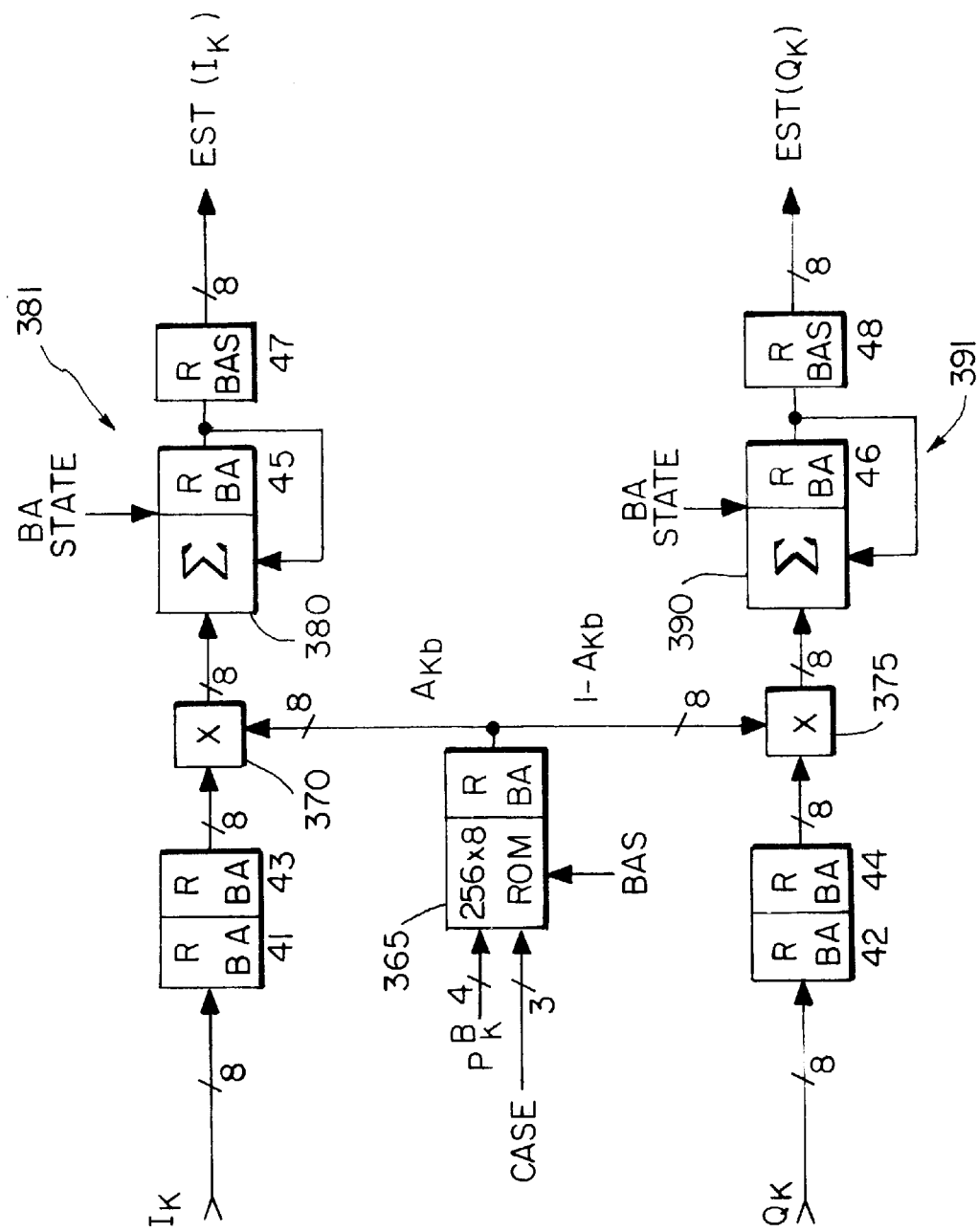
FIG. 3C is a block diagram of a transition sample estimation circuit according to the present invention.

FIG. 3C depicts the internal constitution of the transition sample estimation circuit 120 of FIG. 1. The transition sample estimation circuit shown in FIG. 3C computes the estimated transition sample described above. This step is necessary due to the use of a non-integer number of samples per symbol.

The theory underlying the design of the transition sample estimation circuit is as follows. Since the positions of A and B are known quite accurately during tracking, then a very crude estimate of E, the value at the transition, can be readily obtained by assuming that A, B and E fall on a straight line. However, this will produce a biased estimate of zero crossings, because even in the absence of noise and inter-symbol interference caused by pulses before N or after N+1, A, B and E do not fall on a straight line. This bias is on the order of 2% of a symbol interval. However, it is possible to remove this bias since the filter shape is known (and thus the curve on which A, B and E fall in the absence of noise and ISI). The hardware implementation of the transition sample estimation circuit is based upon the straight line approximation. However, it would be a straight forward matter to incorporate the above-mentioned bias removal.

Initially the phase and level corrected in-phase and quadrature components of the data input from the carrier phase rotator circuit 100 of FIG. 1 are routed through registers 41–44 in order to compensate for delays in the derivation of the P values and passed to a TSE look-up table which is embodied in a 256×8 ROM 365. Registers 41–44 must be duplicated since they are gated with the BA gate instead of the LR gate to select the timing path samples instead of the detection path samples.

The delayed in-phase and quadrature components of the data input are then applied to multipliers 370 and 375 together with TSE coefficients output from the 256×8 ROM 365. These multipliers 370 and 375 perform the operations:

$$t1 = I_{kb} * A_{kb}, \text{ and}$$

$$t2 = I_{ka} * (1 - A_{kb}),$$

where t1 and t2 are temporary results, $A_{kb}$ is a coefficient (where $A_{ka} = 1 - A_{ka}$), and $I_{kb}$ and $I_{ka}$ are the in-phase components of the before and after transition path samples, respectively. The coefficient $A_{kb}$ or $(1 - A_{kb})$ is selected by a BAS signal which is input to the 256×8 ROM 365. The BAS signal tells the LUT whether the B or A sample is at the multiplier input. The BA state input is generated by the P value and gate generator 180, as discussed below. The same operations are performed for the quadrature components of the before and after transition path sample. The coefficients $A_{kb}$ and $(1-A_{kb})$ can be calculated based on a simple assumption of a value of −1 a half symbol before the transition to +1 at a half symbol after the transition, or can be adjusted to compensate for the 2% bias discussed above in manner that will be apparent to those of skill in the art.

The outputs of the multipliers 370 and 375 are fed to adders 380 and 390, respectively. The outputs of the adders 380 and 390 are input to registers 45 and 46, respectively, with the outputs of registers 45 and 46 fed back to adders 380 and 390 to form accumulators 381 and 391. The adders 380 and 390 and the registers 45 and 46 also receive a BA state signal which is output by the P value and gate generator 180 in the manner discussed below. The outputs of the registers 45 and 46 are received by registers 47 and 48 which output an estimated transition sample EST to the clock loop error detection and loop filter circuit 170 of FIG. 1.

Figure 3D:
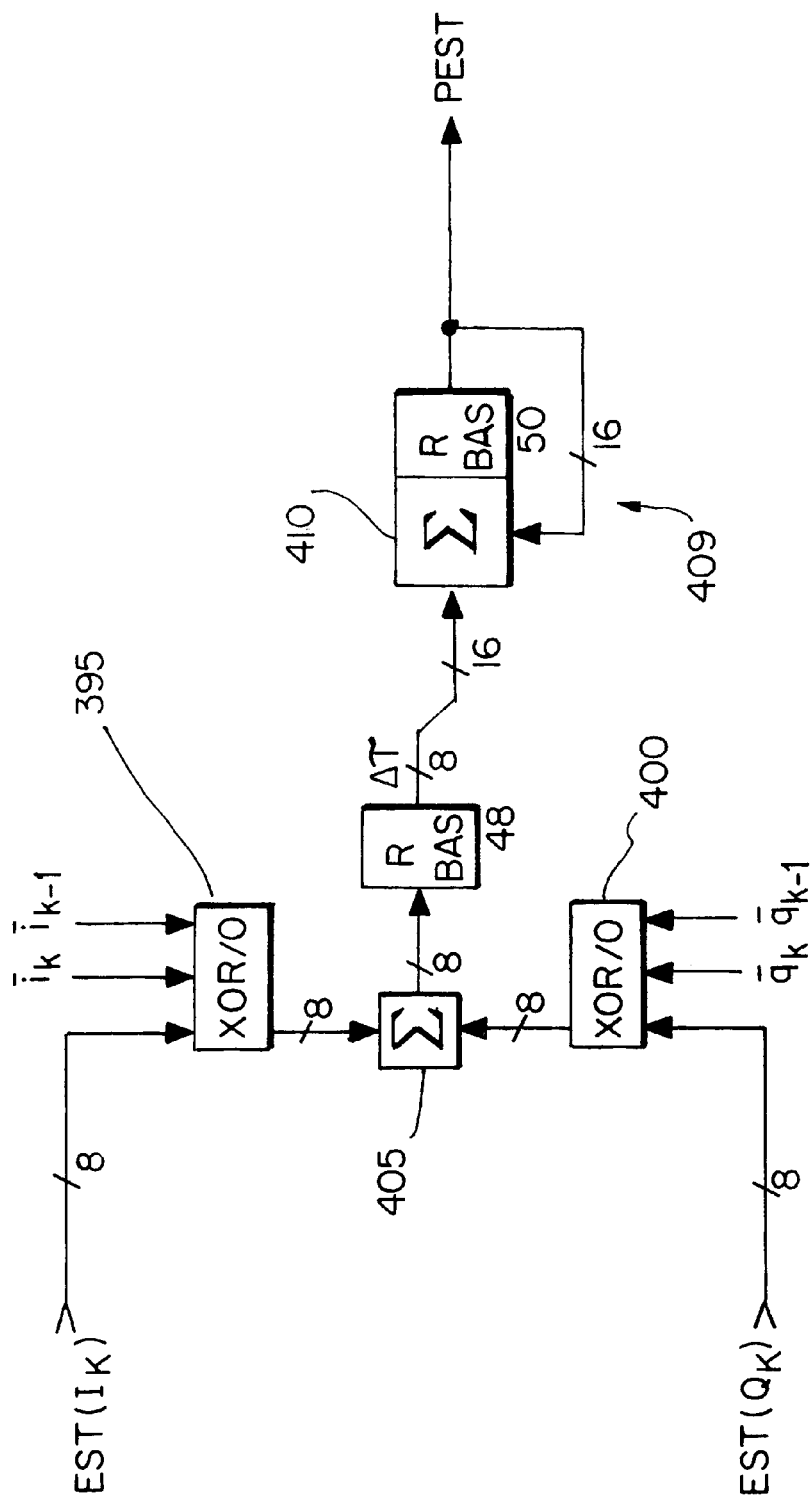
FIG. 3D is a block diagram of a clock loop error detection and loop filter circuit according to the present invention.

The clock loop error detection and loop filter circuit 170 shown in FIG. 3D performs a well known differentiation operation with some simple logic gates 395 and 400 (XOR/ 0's) for the in-phase and quadrature component of the estimated transition sample. The logic associated with the in-phase component of the transition sample is derived from the following description:

| $i_k$ | $i_{k-1}$ | Output |
|---|---|---|
| 0 | 0 | 0 |
| 0 | 1 | ~input |
| 1 | 0 | input |
| 1 | 1 | 0 | where $i_k$ represents the current in-phase component of the transition sample, $i_{k-1}$ represents the previously sampled in-phase component of the transition sample, and '~' indicates bit inversion. This method of negation introduces a single least significant bit (LSB) error which has been shown by the emulation to be insignificant in this application. A similar logic is also employed for the quadrature component of the estimated transition sample.

The result of the operations performed in connection with the in-phase and quadrature components of the estimated transition sample associated with each channel is summed by an adder 405 to produce an error signal Δγ which is stored in register 49. This is then supplied to a symbol timing accumulator 409 which includes an adder 410 and a register 50, to produce an estimated symbol timing correction signal, PEST.

The symbol timing accumulator completes the front end of the first order clock recovery loop. This accumulator is 16 bits in size although only 14 bits are used at the output. Not shown is a programmable barrel shifter which is represented by the jog in the bus which extends from the register 49 and the symbol timing accumulator 409. This barrel shifter sets the gain of the clock loop by scaling the error value fed to the adder. The nominal value for the scaling, which is externally set by factors of two, is 3 bits. Taken together with fixed shifts in the path, this corresponds to a gain of $\frac{1}{16}$ and a loop bandwidth of about 64 (Rs/Bl). Note that the loop bandwidth is normalized by the reduction of the data to about 2 samples/symbol and does not need to change significantly from carrier to carrier.

Figure 3E:
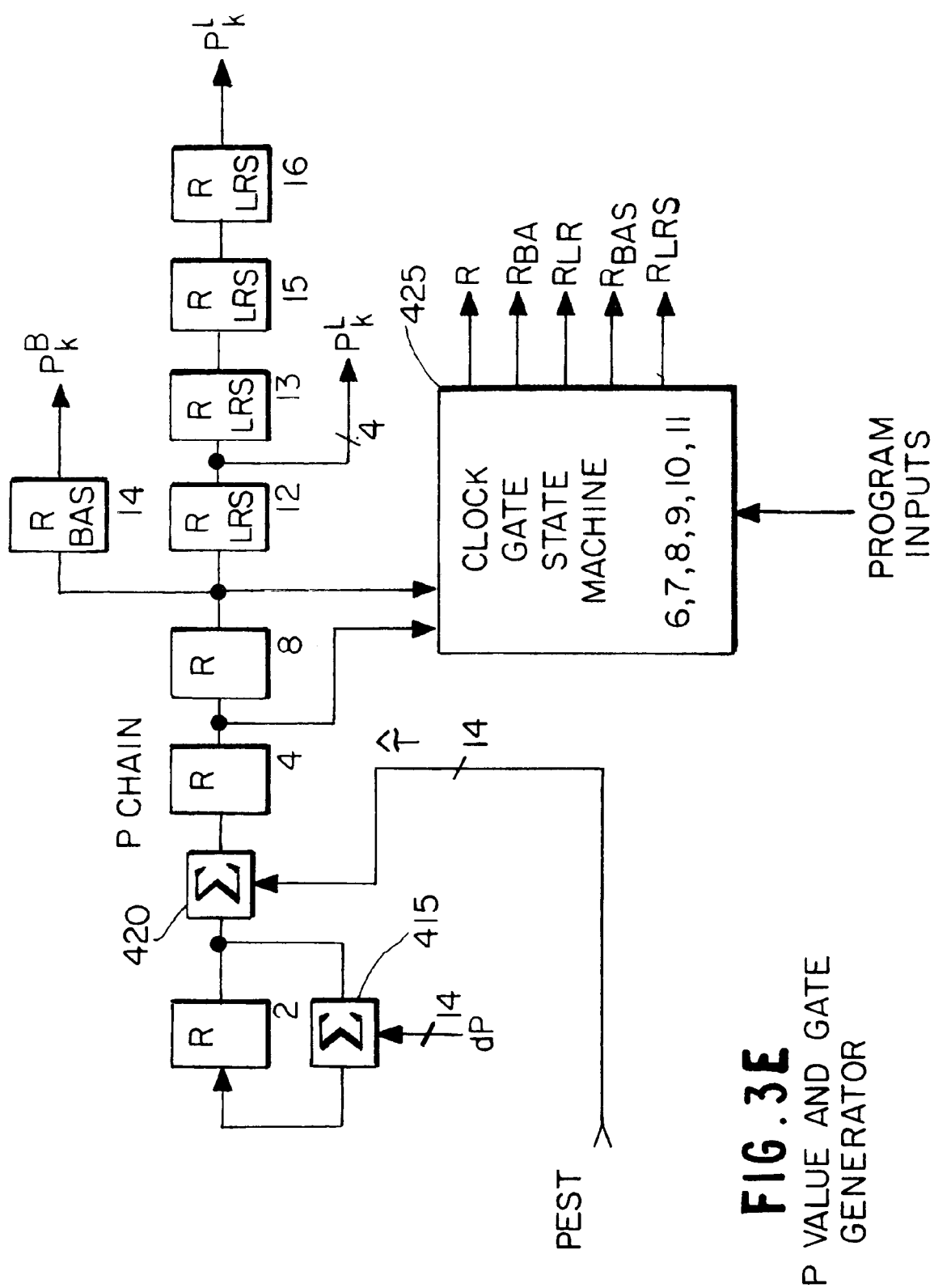
FIG. 3E is a block diagram of a P value and gate generator according to the present invention.

FIG. 3E depicts the internal constitution of the P value and gate generator 180 of FIG. 1. As noted above, the P value and gate generator 180 of FIG. 1 embodies the clock gate state machine and P delay chain which together generate the gates necessary to select the appropriate samples at every stage of processing in the remaining portions of the MCD, thereby closing the clock loop.

A free-running P value generator shown in FIG. 3E is comprised of an adder 415 and a register 2 which receives the output of the adder 415. The adder 415 receives as input the output of the register 2 and the externally generated signal dP. As noted previously, the value of dP is a function of the number of samples per symbol, and, indirectly, the carrier bit rate. In the preferred embodiment, as contrasted with the 0 to 100 example previously described, dP is computed by the following formula:

$$dP = \text{round}(16384/\text{\# samples/symbol}),$$

where the value 16384 is a function of the fact that dP is represented in 14 bits. In this instance, while 14 bits are preferably used to represent the signal dP, a larger or smaller number of bits may also be used without departing from the scope of the invention. The externally generated signal dP is simply the change in position from one sample to the next as described in detail in the references.

With respect to the externally generated signal dP, fourteen bit precision gives settability of 0.006% of a symbol, a value which gives negligible degradation. In the MCD of the present invention, a symbol is considered to run from 0 to 16383, where 8192 represents the detection point, as contrasted with the range of 0 to 100 in the earlier example. The present inventor has discovered that optimum operation is achieved if at least 16383 points are used, and there is no need to use more.

An adder 420 receives the output of the register 2 along with the signal PEST generated by the clock loop error detection and loop filter circuit 170 of FIG. 1. Initially, the P value assumes a random value. The timing correction signal is introduced in order to account for the fact that the estimated transition sample detected by the transition sample estimation circuit 120 at FIG. 1 may not be located at the actual transition point between samples. Thus, the sum of the output of the free running P generator and the timing correction signal generated by the clock loop error detection and loop filter circuit 170 of FIG. 1 yields the exact position or P value for the 'current' sample once the clock loop is locked. The current P value is output by a register 4 which receives the output of the adder 420.

The current position or P value is applied to the clock gate state machine 425 and used to determine which samples are Left, Right, Before, and After values and which samples will be discarded. The current P value is also delayed by the P delay chain including registers 5 and 12–16 in order to derive the appropriate input values for the look-up tables mentioned above. However, the values in the P chain are treated as unsigned numbers by the clock gate state machine and for the purpose of selecting LUT addresses.

The precision of registers 2, 4 and 5, and the related adders 415 and 420 shown in FIG. 3E are preferably 14 bits, while the registers 12–16 of the P delay chain are just wide enough to pass the required precision (generally 4 bits).

The adder 420, included in the free running P generator, rolls over by implementing modulo arithmetic in order to start each symbol over again nominally at zero (as adjusted by the timing offset from the timing accumulator).

The clock gate state machine 425 is designed to ensure that once a sample is selected as L or B, the next sample will always be used for R or A, respectively. Conventional methods of sample selection, including that contemplated in the 1990 paper by Soheil Sayegh, did not always fulfill this requirement.

The clock gate state machine 425 takes as its inputs the current P value output by the register 4 and previous P value from register 5 and produces the LR and BA gate outputs. As indicated in the key for each register shown in FIGS. 3A–3E (the key is actually only shown in FIG. 3A, even though it corresponds to FIGS. 3A–3E), these gates output Left-Right sample (LR), Before-After sample (BA), Left-Right symbol (LRS), and Before-After symbol (BAS) control signals. Registers without these designators are un-gated.

The same state machine design, duplicated in hardware, is used for both LR and BA gate generation, while varying only the inputs. A detailed description of the LR state machine follows for a case in which the is MCD is processing 2–3 samples per symbol, while the inputs for the BA machine are shown thereafter. The inputs to the LR state machine associated with processing 2–3 samples per symbol are as follows:

$$XPLR = r4 < (8192 - dP), \text{ and}$$

$$NewSymLR = r4 < r5.$$

These one-bit signals XPLR and NewSymLR are generated from 14 bit comparators which are internal to the clock gate state machine 425 (8192 is a constant and is hard wired). XPLR indicates a P value that is in front of the actual detection point by a distance of more than 'dP' and therefore will not be used (or, in other words, will be 'X'ed out), while NewSymLR indicates that a new symbol has begun as indicated by the fact that the current P value is smaller than the previous one.

Figure 4:
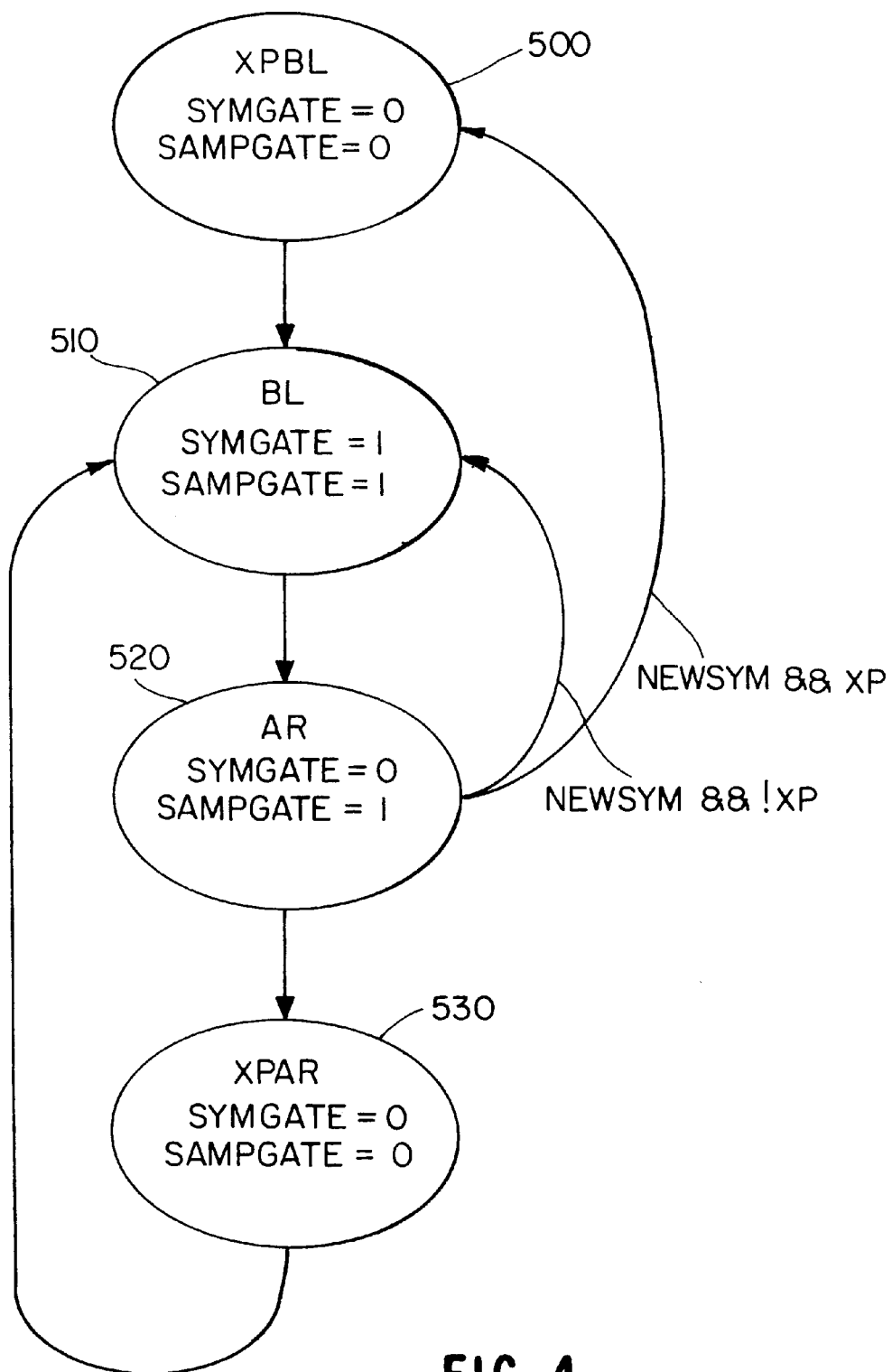
FIG. 4 depicts a clock gate state machine diagram (LR) associated with an MCD which processes 2–3 samples/symbol in accordance with an aspect of the present invention.

The state machine specification, shown graphically in FIG. 4, is as follows:
State XPBL; {See element 500 of FIG. 4}
  SampGate=0; {These samples are always 'X'ed out or are not considered}
  SymGate=0; {Machine always falls through here}
State BL; {See element 510 of FIG. 4}
  SampGate=1; {These samples are always used}
  SymGate=1; {Machine always falls though here}
State AR; {See element 520 of FIG. 4}
  SampGate=1; {Need two samples/symbol}
  SymGate=0; {But only one symbol per symbol}
  if (NewSym && XP) goto XPBL; {Early in new symbol}
  if (NewSym && !XP) goto BL; {Later in new symbol}
State XPAR; {Otherwise fall to here, element 530 of FIG. 4}
  SampGate=0; {This point is 'dP' AFTER the detection point}
  SymGate=0; {So neither sample is used}
  Go to BL; {Loop to BL—since this sample was not used, next sample must be}
where '&&' is a logical AND operation and '!' is logical negation. In accordance with the operation of the LR state machine, the correct LR and LRS gates are output by the clock state gate machine 425.

In the BA state machine of the clock gate state machine 425, the inputs are determined as follows:

$$XPBA = r4 < (16384 - dP), \text{ and}$$

$$NewSymBA = !(r4 < 8192).$$

The symbols XPBA and NewSymBA are used to ensure that the correct BA and BAS gates are generated by a BA state machine designed in the same manner as the above-mentioned LR state machine.

Figure 5:
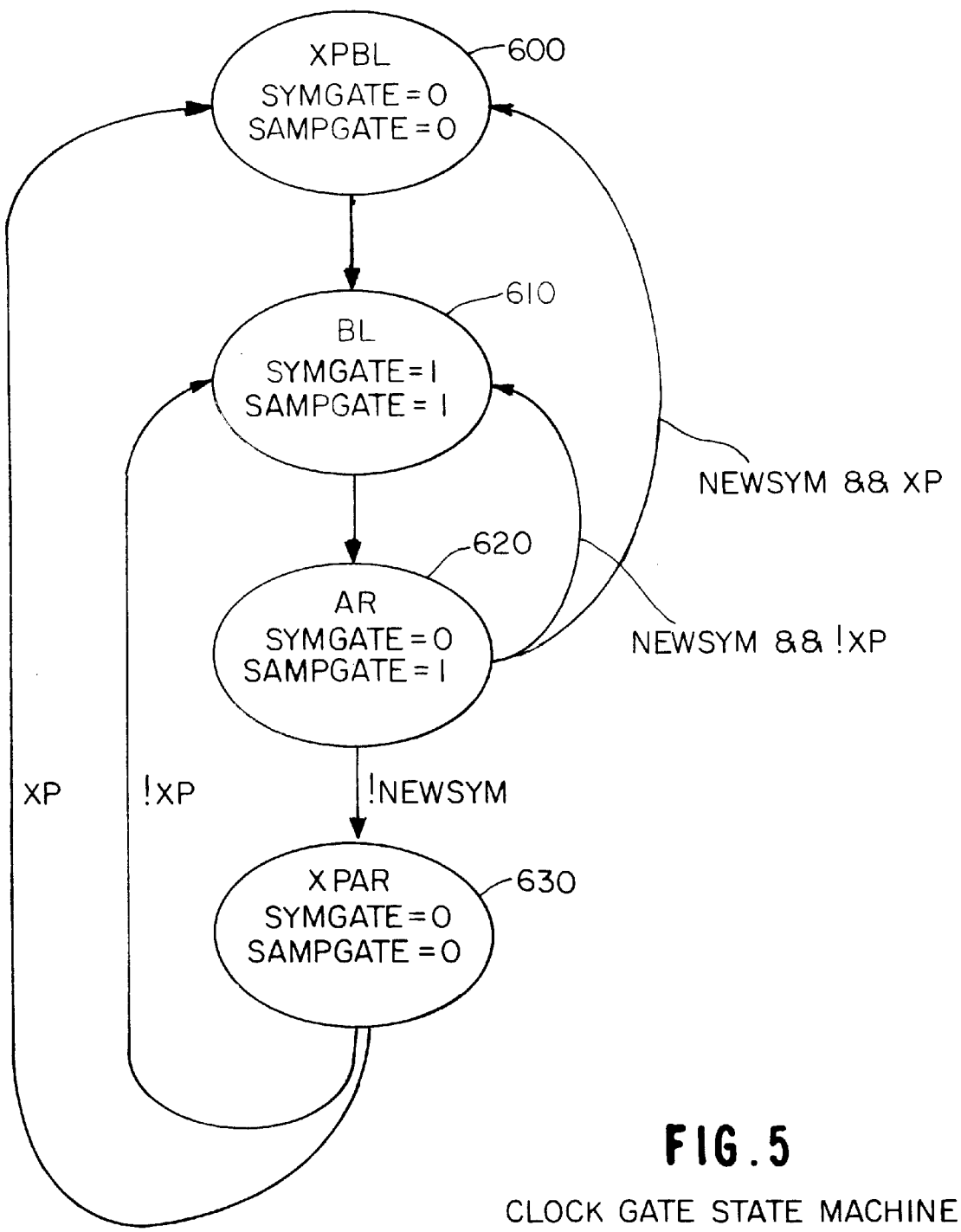
FIG. 5 depicts a clock gate state machine diagram (LR) associated with an MCD which processes 2–4 samples/symbol in accordance with another aspect of the present invention.

The clock gate state machine 425 may also be designed to handle from 2 to 4 samples per symbol in is accordance with LR state machine specification provided below. The LR state machine specification for 2–4 samples per symbol processing is shown graphically in FIG. 5.

As with the design handling 2–3 samples per symbol, only the LR state machine will be presented when discussing 2–4 samples per symbol processing. The BA state machine duplicates the design of the LR state machine with the exception of the input thereto.
State XPBL; {element 600 of FIG. 5}
  SampGate=0; {These samples are always 'X'ed out}
  SymGate=0; {Machine always falls through here}
State BL; {element 610 of FIG. 5}
  SampGate=1; {These samples are always used}
  SymGate=1; {Machine always falls through here}
State AR; {element 620 of FIG. 5}
  SampGate=1; {Need two samples/symbol}
  SymGate=0; {But only one symbol per symbol}
  if (NewSym && XP) goto XPBL; {Early in new symbol}
  if (NewSym && !XP) goto BL; {Later in new symbol}
State XPAR; {Otherwise fall to here, element 630 of FIG. 6}
  SampGate=0; {This point is 'dP' AFTER the detection point}
  SymGate=0; {So neither sample is used}
  if (XP) goto XPBL; {Go to next state as appropriate}
  if (!XP) goto BL;
where '&&' is a logical AND operation and '!' is logical negation.

Other versions of state machine design can support other ranges of samples per symbol without departing from the spirit and scope of the invention.

Advantageously, the above described clock gate state machine eliminates the need for a VCO or NCO in the clock recovery loop where the original clock does not have to be recreated. This can result in significant cost savings in high volume applications.

The Sharing Scheme and Its Implementation

Because the MCD must accommodate multiple carriers associated with different channels, it must swap intermediate results associated with a specific channel from a register to RAM on a channel switch signal. Nearly all of the registers in the device have such a RAM associated with them. Due to the complex relationship of sample and symbol clocks for different data rates, a sophisticated controller and read gate state machine are required to manage the above-described sharing operation.

This on-chip RAM and control circuitry is embodied in the switching controller 190 and allows the single-chip MCD to demodulate an arbitrarily large number of QPSK continuous mode channels in a time shared fashion. In addition, tri-state outputs can be provided in order to allow multiple chips to be shared in order to handle still more channels and to provide for redundancy, while soft decision outputs can be provided which allow for the use of external Viterbi decoders. The operation of the switching controller 190 will be described in greater detail below.

Although not explicitly shown in FIGS. 3A–3E, additional circuitry would be necessary to allow the demodulator hardware to handle a large number (e.g., up to 24) of carriers in a time shared fashion. This circuitry consists mainly of a number of, e.g., 24-word deep memories attached to almost every register in the device (indicated by the key shown in FIGS. 3A–3E) and the state machine to sequence the memory reads and writes at channel switch time. This process is controlled by the switching controller 190 (FIG. 1), is orthogonal to the demodulation process and is shown in a separate block diagram and discussed at length below, including a detailed description of the shared register design and requisite state machines.

The switching controller 190 receives externally generated control inputs or signals, block sync (BS) and switch (SW). Internally, the switching controller 190 includes a channel address counter (not shown) and four read gate state machines (RGSMs) (not shown). Switching controller 190 produces outputs to control reading, writing and addressing of the shared registers.

The channel address counter included in the switching controller 190 is simply cleared by BS and incremented by SW. This sequences the address applied to the shared registers when the MCD is operating in non-DCS (dynamic channel switching) mode. When the MCD is operating in DCS mode, the channel address is supplied externally.

The read gate state machines are required because, whenever a channel processing slot begins in shared mode, it is necessary not only to read the RAMs associated with the shared registers but also to hold the RAMs in read mode until their outputs can be clocked into the next stage. In other words, the simplest case would be to write the last value from channel N-1 during the last clock time of channel N-1 and to read the stored value for channel N during the first clock time of channel N. However, due to the fact that the clocks are gated by LR, LRS, BA, BAS, and, indirectly, DV (a "data valid" signal of a type commonly used), it will often be the case that the clock is inactive during the first, second, or even the third nominal clock time after switching. In these cases, it is necessary to extend the read gate until the first clock in the next (downstream) stage occurs.

In order to achieve the above-mentioned extension, four read gate state machines are required. One of each read gate state machine is provided for LR, LRS, BA, and BAS. In addition, each read gate state machine takes as inputs the respective clock gate and the switch signal and outputs the related read gate signal. Only one RGSM will be described since they are duplicated four times, with only their inputs and outputs differing in each case.

Figure 6:
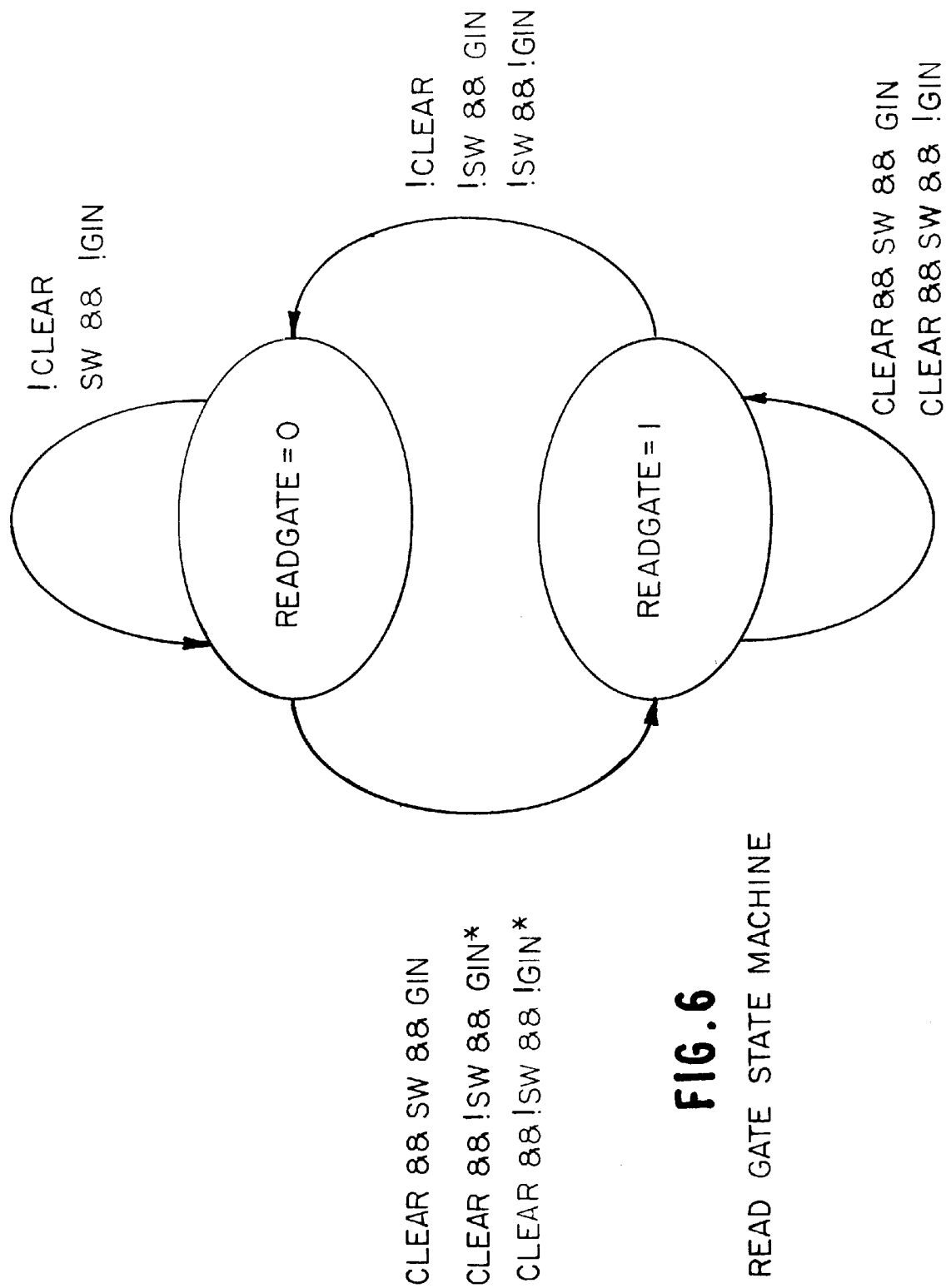
FIG. 6 depicts a read gate state machine diagram according to the present invention.

Each read gate state machine uses a truth table implementation to establish the state sequence. The logic realization of the truth table is combined with a simple register to complete the implementation. However, the switching controller 190 is not itself shared. An exemplary state diagram embodying the operation of each read gate state machine is shown is shown in FIG. 6 (expressions followed by an asterisk are merely included for completeness). Each gate signal, LR, LRS, BA and BAS, is active low. In normal operation, if the gate signal is low, it stays low until GIN (gate in) goes high. However, if the gate signal is high, it stays high until SW goes low. A clear always sets the gate to low (enabled).

Figure 7:
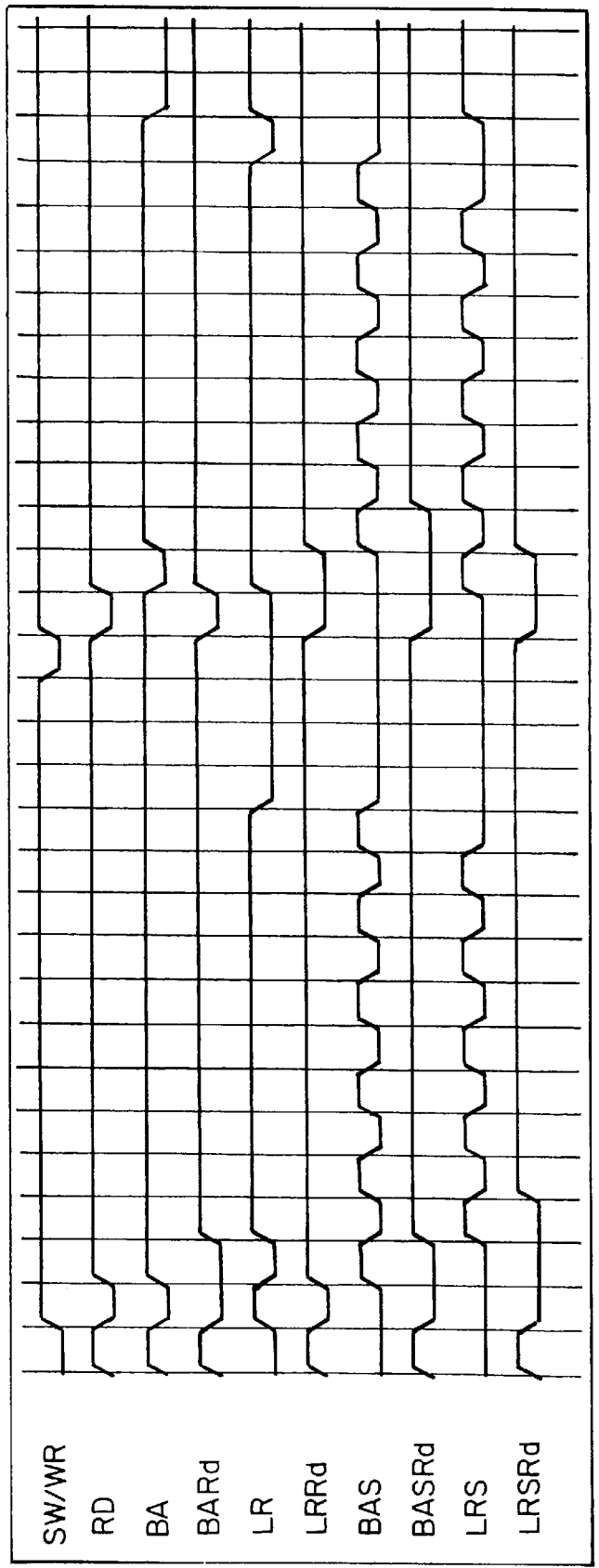
FIG. 7 depicts a read gate timing diagram according to the present invention.

By operating in conformity with the state machine diagram shown in FIG. 6, the switching controller 190 is able to hold the read gate low until the clock has been enabled for the gate in question. By way of example, FIG. 7 shows that a BARd signal (or BA read pulse) goes high one cycle after a BA signal goes high, while an LRRd signal does the same. However, observe that the BASRd signal goes high one cycle later, only after a BAS signal has gone high, and the LRSRd signal goes high still another cycle later to reflect the even longer delay in the LRS signal.

Ungated, but shared, registers are supplied with a switch (SW) signal delayed by one, which is, in effect, a read gate that is always one clock period long. The operation of the read gate at the destination is discussed below in conjunction with the shared register. All shared registers are passed the SW signal as the write strobe.

In DCS mode, the channel address is supplied by an external controller instead of the internal counter. Delays are matched to keep everything lined up. The SW signal is still supplied to the sharing controller to initiate reads and writes, however the generation of the WR strobe is inhibited when the chip is not selected (by RS, also generated by the external controller) to prevent the overwriting of data for channels of the same address that are being accessed on some other chip.

RS also controls tri-stating the outputs to allow sharing of ASICs in the mid band. Finally, RS forces DV low to disable clocking on the chips that are not being used to reduce power consumption to minimal levels.

Figure 8:
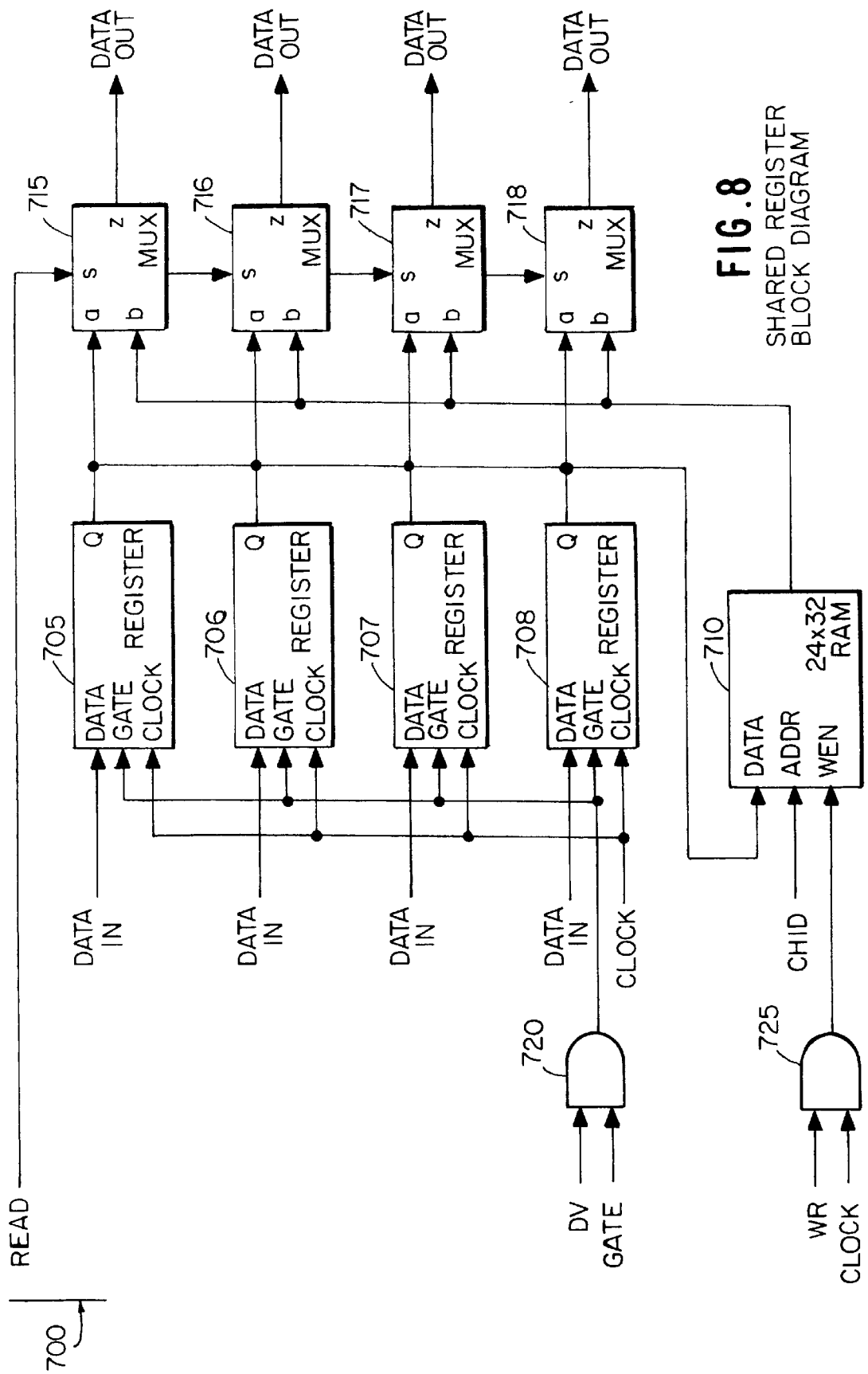
FIG. 8 depicts a shared register block diagram according to the present invention.

The shared register is the heart of the multi-carrier capability of the MCD of the present invention. As shown in FIG. 8, which is one non-limiting example of a suitable implementation, the shared register 700 may be implemented as four 8-bit registers 705–708 with a 24-by-32 bit RAM 710 attached thereto. In addition to the registers 705–708 and the RAM 710, the shared register 700 includes four multiplexers 715–718 and two AND logic gates 720 and 725. All but one of the shared registers in the MCD are set up to allow use as four separate 8-bit registers, while one is modified to be used in the carrier loop as two separate registers, one of 14 bits, and the other of 18 bits. The 32-bit-wide overall organization is dictated by efficiency of RAM utilization. Using 8-bit-wide RAMs would have resulted in unnecessary duplication of decoding circuitry and inefficient placement of the RAMs on the die, considering the fact that all RAMs must be placed around the periphery of the chip. RAMs larger than 32 bits wide might possibly have been more efficient, however they were not supported by the ASIC vendor memory compiler.

In normal operation, all of the registers 705–708 of the shared register 700 act as ordinary latches when an input 'a' of the corresponding multiplexer 715–718 is selected. In read mode, input 'b' is selected, and the outputs of the RAM 710 are available at the shared register output. In practice, all of the four 8-bit registers 705–708 have their gates and read inputs separately controlled. This allows them to be used in different places within modules with different gating requirements.

At write time, the current outputs of the registers are stored in the RAMs. The write enable (WEN) input of the RAM 710 is gated with the clock to ensure that timing requirements are met. The address for the RAMs is the channel ID input (CHID), which selects the appropriate channel for writing or reading.

The registers are effectively clock gated by the gate input. The circuitry shown supports gating by either DV or the LR, BA, LRS, or BAS gates. When either of these gate inputs are low, the register holds its contents constant, effectively freezing operation.

In addition to the applicability in gated clock environments, this approach provides another significant advantage. Note that during the read cycle, the output of the RAM 710 is fed forward to the next stage rather than back into the present register. This allows the read cycle to also function as a processing cycle, reducing overhead significantly in applications with high channel switching rates. This is different from the classic time shared computer equivalent wherein the registers are restored with their original contents before processing resumes, effectively taking at least 2 cycles for every swapping operation (one write and one read) rather than one (the write cycle) as in this case.

Although certain preferred embodiments of the present invention have been described, various changes and modifications to the disclosed embodiment can be made without departing from the spirit and scope of the invention as defined in the appended claims.

What is claimed is:

1. In an asynchronous communication system incorporating a detection-transition sample estimation scheme in order to identify symbols in respective symbol intervals of an input data signal, a demodulator circuit comprising:
   an initial detection sample estimation circuit which receives said input data signal and produces estimated detection samples based on a plurality of samples within each symbol interval and in accordance with at least one detection control signal;
   a transition sample estimation circuit which receives said input data signal and produces estimated transition samples each based on a plurality of samples of said input data signal in accordance with at least one transition control signal; and
   a control signal generator for generating said detection and transition control signals in accordance with classifications of said detection and transition samples as to positions of the detection and transition samples within said symbol intervals, said control signal generator classifying certain of said detection samples as being prior to a reference position in a symbol interval and classifying certain of said detection samples as being subsequent to said reference position, and ensuring that every sample immediately following a sample classified as prior to said reference position is classified as subsequent to said reference position.

2. A demodulator in accordance with claim 1, wherein said control signal generator classifies certain of said transition samples as being prior to a transition between symbols in said input data signal and certain of said transition samples as being subsequent to a transition between symbols in said input data signal, said control signal generator ensuring that every sample immediately following a sample classified as prior to a transition is classified as subsequent to a transition.

3. A demodulator according to claim 1, further comprising a clock loop error detection and loop filter circuit which receives the estimated transition samples and produces an estimated symbol timing correction signal in accordance with said estimated transition samples and in accordance with values of previous symbols, and wherein said control signal generator produces said detection and transition control signals in accordance with said estimated symbol timing correction signal.

4. A demodulator in accordance with claim 3, wherein said control signal generator produces said detection and transition control signals further in accordance with an expected distance between successive samples.

5. A demodulator in accordance with claim 1, wherein said control signal generator generates a first detection control signal to said initial detection sample estimation circuit representing the position within a symbol interval of one of said samples.

6. A demodulator in accordance with claim 5, wherein said first detection control signal represents the position within said symbol interval of a sample classified as being prior to said reference position.

7. A demodulator in accordance with claim 6, wherein said control signal generator generates a second detection control signal to said initial detection sample estimation circuit representing the position within a symbol interval of a sample classified as being subsequent to said reference position.

8. A demodulator in accordance with claim 1, wherein said control signal generator generates a first transition control signal to said transition sample estimation circuit representing the position within a symbol interval of one of said samples.

9. A demodulator in accordance with claim 8, wherein said first transition control signal represents the position within said symbol interval of a sample classified as being prior to a transition.

10. A demodulator in accordance with claim 9, wherein said control signal generator generates a second transition control signal to said transition sample estimation circuit representing the position within a symbol interval of a sample classified as being subsequent to a transition.

11. A demodulator in accordance with claim 5, wherein said detection sample estimation circuit and transition sample estimation circuit generate their respective estimates further in accordance with a further control signal representing a number of samples per symbol.

12. A demodulator in accordance with claim 11, wherein said first detection control signal is an n-bit signal and said further control signal is less than n bits.

13. A demodulator in accordance with claim 12, wherein said further control signal is n-1 bits.

14. A demodulator in accordance with claim 1, wherein said detection and transition control signals include sampling control signals for selecting samples for use in producing said estimated detection and transition samples.

15. A demodulator circuit in accordance with claim 1, further comprising an inter-symbol interference removal circuit which receives said estimated detection sample and removes effects of inter-symbol interference therefrom in order to produce an inter-symbol interference corrected symbol of said input data signal which is provided as an output of said demodulator circuit.

16. A demodulator circuit in accordance with claim 1, wherein said input data signal comprises asynchronous input data.

17. A demodulator circuit in accordance with claim 14, wherein said initial detection sample estimation circuit discards samples that are located more than a predetermined distance from said reference position.

18. A demodulator circuit in accordance with claim 14, wherein said transition sample estimation circuit discards samples that are located more than a predetermined distance from an expected transition location.

19. A demodulator circuit in accordance with claim 1, wherein each said detection sample estimation circuit and transition sample estimation circuit comprises:
   a first register for data being processed;
   a second register downstream of said first register in a signal processing path;
   a random access memory (RAM) having an input connected to an output of said first register; and
   a selection circuit receiving as inputs said first register output and an output of said RAM, and responsive to a control signal for selecting one of its inputs as an output to an input of said second register.

20. A demodulator in accordance with claim 19, wherein said selector output is loaded into said second register in response to a clock signal, data is provided at said output of said RAM during a read cycle of said RAM, and said read cycle of said RAM is extended until said clock signal occurs.

21. A demodulator in accordance with claim 19, wherein said RAM receives as at least a portion of an address input a signal representing a respective one of a plurality of channels with which said demodulator is operable.

22. In an asynchronous communication system incorporating a detection-transition sample estimation scheme in order to identify symbols in respective symbol intervals of an input data signal, a demodulation method comprising the steps of:

producing estimated detection samples from said input data signal based on a plurality of samples within each symbol interval and in accordance with at least one detection control signal;

producing estimated transition samples from said input data signal each based on a plurality of samples of said input data signal in accordance with at least one transition control signal; and generating said detection and transition control signals in accordance with classifications of said samples based on their positions within said symbol intervals, said generating step including the steps of classifying certain of said samples as being prior to a reference position in a symbol interval and classifying certain of said samples as being subsequent to said reference position, and ensuring that every sample immediately following a sample classified as prior to said reference position is classified as subsequent to said reference position.

23. A method in accordance with claim 22, wherein said step of generating said control signals comprises classifying certain of said samples as being prior to a transition between symbols in said input data signal and certain of said samples as being subsequent to a transition between symbols in said input data signal, and ensuring that every sample immediately following a sample classified as prior to a transition is classified as subsequent to a transition.

24. A method in accordance with claim 23, further comprising the step of producing an estimated symbol timing correction signal in accordance with said estimated transition samples and in accordance with values of previous symbols, and wherein said generating step comprises producing said detection and transition control signals in accordance with said estimated symbol timing correction signal.

25. A method in accordance with claim 24, wherein said generating step comprises producing said detection and transition control signals further in accordance with an expected distance between successive samples.

26. A method in accordance with claim 22, wherein said generating step further comprises generating a first detection control signal to said initial detection sample estimation circuit representing the position within a symbol interval of one of said samples.

27. A method in accordance with claim 26, wherein said first detection control signal represents the position within said symbol interval of a detection sample classified as being prior to said reference position.

28. A method in accordance with claim 27, wherein said generating step further comprises generating a second detection control signal to said initial detection sample estimation circuit representing the position within a symbol interval of one of said samples classified as being subsequent to said reference position.

29. A method in accordance with claim 22, wherein said generating step comprises generating a first transition control signal to said transition sample estimation circuit representing the position within a symbol interval of one of said samples.

30. A method in accordance with claim 29, wherein said first transition control signal represents the position within said symbol interval of a sample classified as being prior to a transition.

31. A method in accordance with claim 30, wherein said generating step comprises generating a second transition control signal to said transition sample estimation circuit representing the position within a symbol interval of one of said samples classified as being subsequent to a transition.

32. A method in accordance with claim 26, wherein said steps of producing said estimated detection and transition samples comprise generating said estimated transition and detection samples in accordance with a further control signal representing a number of samples per symbol.

33. A method in accordance with claim 32, wherein said first detection control signal is an n-bit signal and said further control signal is less than n bits.

34. A method in accordance with claim 33, wherein said further control signal is n-1 bits.

35. A method in accordance with claim 22, wherein said detection and transition control signals include sampling control signals for selecting samples for use in producing said estimated detection and transition samples.

36. A method in accordance with claim 22, further comprising the step of removing effects of inter-symbol interference from said estimated detection sample in order to produce an inter-symbol interference corrected symbol of said input data signal which is provided as an output of said demodulator circuit.

37. A method in accordance with claim 22, wherein said input data signal comprises asynchronous input data.

38. A method in accordance with claim 35, wherein said step of producing said estimated detection samples comprises discarding samples that are located more than a predetermined distance from said reference position.

39. A method in accordance with claim 35, wherein said step of producing said estimated transition samples comprises discarding samples that are located more than a predetermined distance from an expected transition location.

40. A method in accordance with claim 22, further comprising the steps of:

storing data in a first register data being processed related to a first channel;

storing said first data in a random access memory (RAM);

connecting an output of said RAM and an output of said first register in parallel to inputs of a selection circuit; and selecting one of said selection circuit inputs for loading to a second register downstream of said first register in a signal processing path.

41. A method in accordance with claim 40, wherein said selection circuit output is loaded into said second register in response to a clock signal, and data is provided at said output of said RAM during a read cycle of said RAM, said method further comprising extending said read cycle of said RAM until said clock signal occurs.

42. A method in accordance with claim 40, wherein said RAM receives as at least a portion of an address input a signal representing a respective one of a plurality of channels with which said demodulator is operable.

43. A circuit for performing signal processing on a plurality of different signals in an interleaved manner, comprising:

a first register for storing data being processed from one of said signals;

a second register downstream of said first register in a signal processing path;

a random access memory (RAM) having an input coupled to an output of said first register; and a selection circuit for selecting one of said outputs of said first register and RAM for loading to said second register.

44. A circuit in accordance with claim 43, wherein said selection circuit output is loaded into said second register in response to a clock signal, data is provided at said output of said RAM during a read cycle of said RAM, and said read cycle of said RAM is extended until said clock signal occurs.

45. A circuit in accordance with claim 43, wherein said RAM receives as at least a portion of an address input a signal representing a respective one of said plurality of signals.

46. A method of performing signal processing on a plurality of different signals in an interleaved manner, comprising:

storing in a first register data being processed from one of said signals;

storing in a random access memory (RAM) data from said first register;

providing outputs from said first register and RAM in common to inputs of a selection circuit; and selecting one of said inputs for loading to a second register downstream of said first register in a signal processing path.

47. A method in accordance with claim 46, wherein said selection circuit output is loaded into said second register in response to a clock signal, and data is provided at said output of said RAM during a read cycle of said RAM, said method further comprising extending said read cycle of said RAM until said clock signal occurs.

48. A method in accordance with claim 46, wherein said RAM receives as at least a portion of an address input a signal representing a respective one of said plurality of signals.

* * * * *